(12) United States Patent
Togashi

(10) Patent No.: US 7,535,694 B2
(45) Date of Patent: May 19, 2009

(54) FEEDTHROUGH MULTILAYER CAPACITOR

(75) Inventor: Masaaki Togashi, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 12/178,188

(22) Filed: Jul. 23, 2008

(65) Prior Publication Data
US 2009/0034153 A1 Feb. 5, 2009

(30) Foreign Application Priority Data
Jul. 30, 2007 (JP) .................... P2007-197837

(51) Int. Cl.
*H01G 4/228* (2006.01)

(52) U.S. Cl. .................. 361/306.1; 361/302; 361/303; 361/306.3; 361/321.1; 361/301.4

(58) Field of Classification Search .............. 361/306.1, 361/306.3, 302–305, 311–313, 321.1, 321.2, 361/307, 308.1, 301.4
See application file for complete search history.

(56) References Cited

U.S. PATENT DOCUMENTS

| | | | | |
|---|---|---|---|---|
| 5,822,174 | A * | 10/1998 | Yamate et al. | 361/302 |
| 6,147,571 | A * | 11/2000 | Kitazawa et al. | 333/126 |
| 6,191,932 | B1 * | 2/2001 | Kuroda et al. | 361/303 |
| 6,456,481 | B1 * | 9/2002 | Stevenson | 361/302 |
| 6,563,689 | B2 * | 5/2003 | Yamamoto | 361/306.1 |
| 6,587,020 | B2 * | 7/2003 | Tojyo | 333/185 |
| 6,661,312 | B2 * | 12/2003 | Orihara | 333/185 |
| 6,914,767 | B2 * | 7/2005 | Togashi et al. | 361/303 |
| 7,046,500 | B2 * | 5/2006 | Lee et al. | 361/303 |
| 7,050,288 | B2 * | 5/2006 | Ahiko et al. | 361/303 |

FOREIGN PATENT DOCUMENTS

JP A-1-206615 8/1989

* cited by examiner

Primary Examiner—Nguyen T Ha
(74) Attorney, Agent, or Firm—Oliff & Berridge, PLC

(57) ABSTRACT

A first signal internal electrode is connected to a first signal terminal electrode and a second signal internal electrode is connected to a second signal terminal electrode. A first ground internal electrode is connected to a first ground terminal electrode and a second ground internal electrode is connected to a second ground terminal electrode. The first signal internal electrode and the first ground internal electrode have their respective opposed regions. The second signal internal electrode and the second ground internal electrode have their respective opposed regions. The first signal internal electrode and the second ground internal electrode are not opposed to each other. The second signal internal electrode and the first ground internal electrode are not opposed to each other. The first signal internal electrode and the second signal internal electrode are connected through a signal throughhole conductor. The first ground internal electrode and the second ground internal electrode are connected through a ground throughhole conductor.

8 Claims, 14 Drawing Sheets

Fig.3
(a)
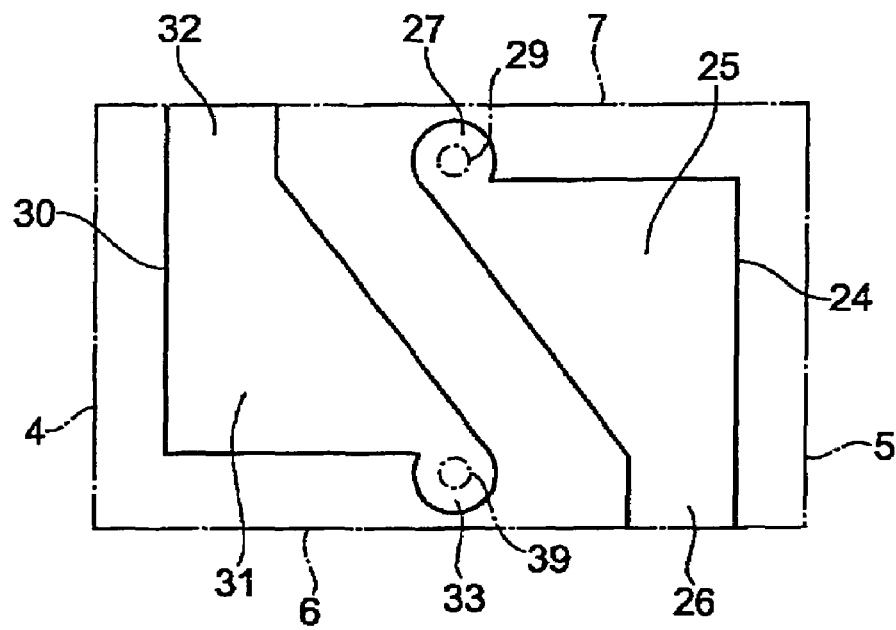
(b)
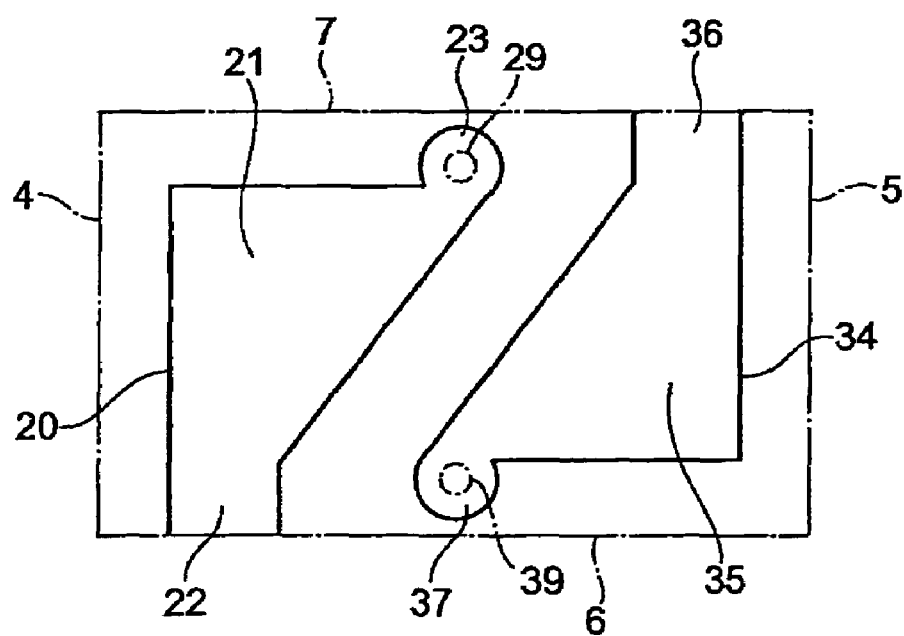

Fig.7
(a)
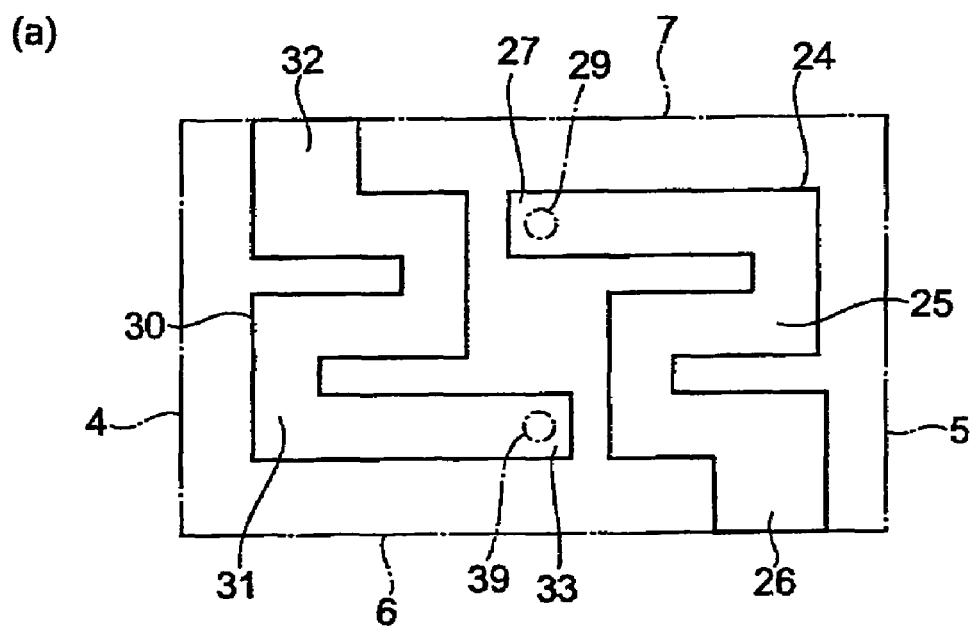
(b)
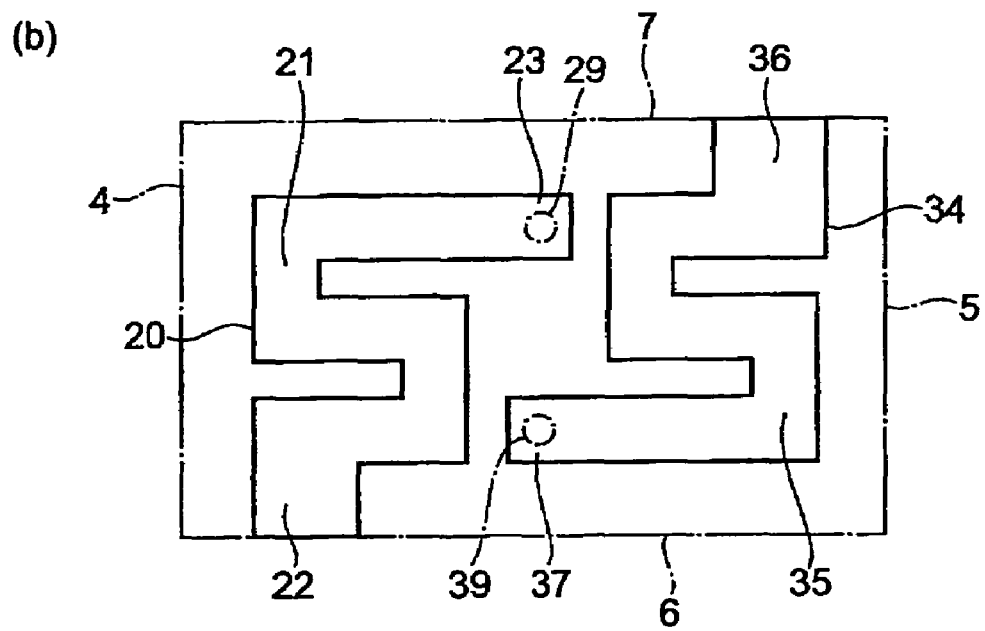

Fig.9
(a)
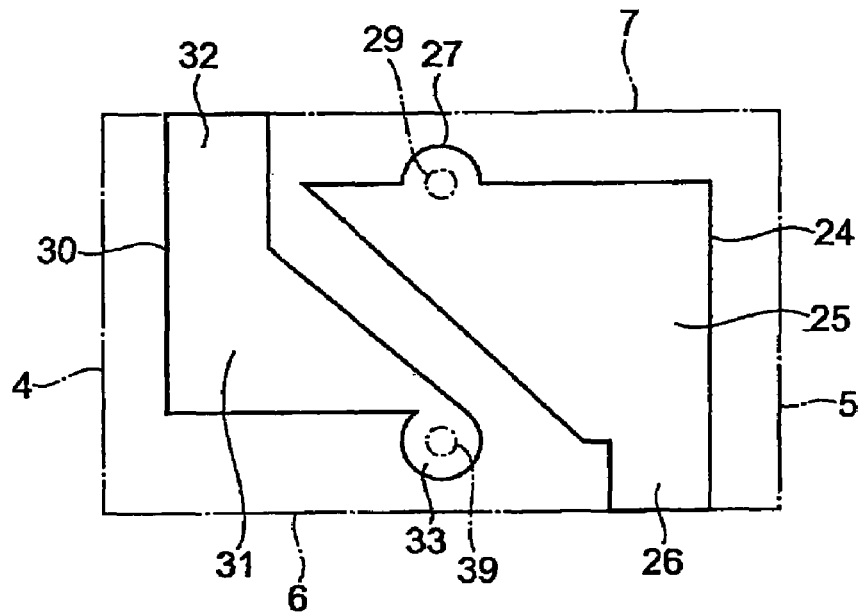
(b)
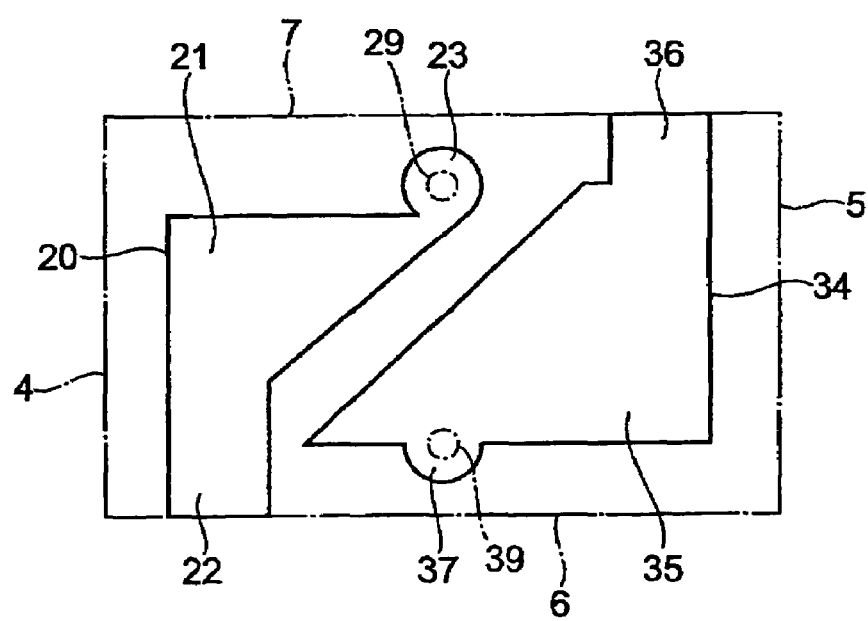

FEEDTHROUGH MULTILAYER CAPACITOR

BACKGROUND OF THE INVENTION

1. Field of the Invention

The present invention relates to a feedthrough multilayer capacitor.

2. Related Background Art

A known feedthrough multilayer capacitor is one having a capacitor element body in which dielectric layers and signal and ground internal electrodes are alternately laminated, and signal and ground terminal electrodes formed on the capacitor element body (e.g., cf. Japanese Patent Application Laid-open No. 01-206615).

SUMMARY OF THE INVENTION

An object of the present invention is to provide a feedthrough multilayer capacitor permitting implementation of a circuit in which a plurality of capacitance components are connected in parallel, as a single element.

It is common practice to load a plurality of feedthrough multilayer capacitors on an electronic device. For this reason, a mount space is expended in the electronic device by the number of loaded capacitors. Then the inventors conducted extensive and intensive research on a feedthrough multilayer capacitor permitting implementation of a parallel circuit of capacitance components, as a single element, and accomplished the present invention.

A feedthrough multilayer capacitor according to the present invention is a feedthrough multilayer capacitor comprising: a capacitor element body with a dielectric property; first and second signal internal electrodes and first and second ground internal electrodes arranged in the capacitor element body; and first and second signal terminal electrodes and first and second ground terminal electrodes arranged on an exterior of the capacitor element body; wherein the first signal internal electrode is connected to the first signal terminal electrode; wherein the second signal internal electrode is connected to the second signal terminal electrode; wherein the first ground internal electrode is connected to the first ground terminal electrode; wherein the second ground internal electrode is connected to the second ground terminal electrode; wherein the first signal internal electrode and the first ground internal electrode have respective regions opposed so as to sandwich at least a portion of the capacitor element body; wherein the second signal internal electrode and the second ground internal electrode have respective regions opposed so as to sandwich at least a portion of the capacitor element body; wherein the first signal internal electrode and the second ground internal electrode are not opposed to each other, wherein the second signal internal electrode and the first ground internal electrode are not opposed to each other; wherein the first signal internal electrode and the second signal internal electrode are connected through a signal throughhole conductor arranged in the capacitor element body; and wherein the first ground internal electrode and the second ground internal electrode are connected through a ground throughhole conductor arranged in the capacitor element body.

In the feedthrough multilayer capacitor according to the present invention, the first signal internal electrode and the first ground internal electrode have their respective regions opposed to each other, and the second signal internal electrode and the second ground internal electrode have their respective regions opposed to each other. The first signal internal electrode and the second ground internal electrode are not opposed to each other and the second signal internal electrode and the first ground internal electrode are not opposed to each other. For these reasons, the feedthrough multilayer capacitor realizes a circuit in which the following capacitance components are connected in parallel: a capacitance component made by the opposed regions of the first signal internal electrode and the first ground internal electrode; a capacitance component made by the opposed regions of the second signal internal electrode and the second ground internal electrode.

Preferably, the first signal internal electrode and the second ground internal electrode are located in an identical layer, and the second signal internal electrode and the first ground internal electrode are located in an identical layer. This configuration reduces the number of layers of internal electrodes and thus permits the feedthrough multilayer capacitor to be constructed in a lower profile.

Preferably, the first and second signal internal electrodes and the first and second ground internal electrodes are of a meander shape. In this case, the feedthrough multilayer capacitor can have large impedance.

Preferably, an area of the opposed regions of the first signal internal electrode and the first ground internal electrode is different from an area of the opposed regions of the second signal internal electrode and the second ground internal electrode. In this case, the sizes of the two capacitance components are different from each other. For this reason, the feedthrough multilayer capacitor has low impedance over a wide frequency band.

Preferably, the capacitor element body has first and second principal faces of a rectangular shape facing each other, first and second end faces extending in a transverse direction of the first and second principal faces so as to connect the first and second principal faces, and first and second side faces extending in a longitudinal direction of the first and second principal faces so as to connect the first and second principal faces; the first and second signal terminal electrodes are disposed on the first side face, the first and second ground terminal electrodes are disposed on the second side face; the signal throughhole conductor is located nearer the second side face; and the ground throughhole conductor is located nearer the first side face. In this case, the signal throughhole conductor is located apart from the ground throughhole conductor, whereby the two capacitance components can be formed as more suitably separated from each other.

Preferably, the first signal internal electrode has a main electrode portion including the region opposed to the first ground internal electrode, a lead portion extending from the main electrode portion and connected to the first signal terminal electrode, and a connection portion connected to the signal throughhole conductor; the second signal internal electrode has a main electrode portion including the region opposed to the second ground internal electrode, a lead portion extending from the main electrode portion and connected to the second signal terminal electrode, and a connection portion connected to the signal throughhole conductor; the first ground internal electrode has a main electrode portion including the region opposed to the first signal internal electrode, a lead portion extending from the main electrode portion and connected to the first ground terminal electrode, and a connection portion connected to the ground throughhole conductor; and the second ground internal electrode has a main electrode portion including the region opposed to the second signal internal electrode, a lead portion extending from the main electrode portion and connected to the second ground terminal electrode, and a connection portion connected to the ground throughhole conductor.

Another feedthrough multilayer capacitor according to the present invention is a feedthrough multilayer capacitor comprising: a capacitor element body with a dielectric property; a plurality of internal electrode groups each of which includes a signal internal electrode and a ground internal electrode arranged in the capacitor element body so as to have respective regions opposed so as to sandwich at least a portion of the capacitor element body; and first and second signal terminal electrodes and first and second ground terminal electrodes arranged on an exterior of the capacitor element body; wherein the signal internal electrodes in the respective internal electrode groups are electrically connected to each other and at least one of electrical connections between the signal internal electrodes is made by a signal throughhole conductor arranged in the capacitor element body; wherein the ground internal electrodes in the respective internal electrode groups are electrically connected to each other, and at least one of electrical connections between the ground internal electrodes is made by a ground throughhole conductor arranged in the capacitor element body; wherein one signal internal electrode among the signal internal electrodes in the respective internal electrode groups is connected to the first signal terminal electrode, and any one signal internal electrode other than the one signal internal electrode among the signal internal electrodes in the respective internal electrode groups is connected to the second signal terminal electrode; wherein one ground internal electrode among the ground internal electrodes in the respective internal electrode groups is connected to the first ground terminal electrode, and any one ground internal electrode other than the one ground internal electrode among the ground internal electrodes in the respective internal electrode groups is connected to the second ground terminal electrode; and wherein the signal internal electrode and the ground internal electrode in respective different internal electrode groups among the plurality of internal electrode groups are not opposed to each other.

In the feedthrough multilayer capacitor according to the present invention, the signal internal electrode and the ground internal electrode in each internal electrode group have their respective regions opposed to each other. The signal internal electrode and the ground internal electrode in different internal electrode groups are not opposed to each other. For these reasons, in the feedthrough multilayer capacitor there are capacitance components formed by the respective internal electrode groups and these capacitance components thus formed are connected in parallel. Therefore, the present invention realizes a circuit in which a plurality of capacitance components are connected in parallel.

Preferably, all the electrical connections between the signal internal electrodes are made by the signal throughhole conductor arranged in the capacitor element body; and all the electrical connections between the ground internal electrodes are made by the ground throughhole conductor arranged in the capacitor element body.

The present invention successfully provides the feedthrough multilayer capacitor permitting implementation of a circuit in which a plurality of capacitance components are connected in parallel, as a single element.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 3 is a drawing showing configurations of internal electrodes.

FIG. 7 is a drawing showing configurations of internal electrodes.

FIG. 9 is a drawing showing configurations of internal electrodes.

DESCRIPTION OF THE PREFERRED EMBODIMENTS

The preferred embodiments of the present invention will be described below in detail with reference to the accompanying drawings. In the description the same elements or elements with the same functionality will be denoted by the same reference symbols, without redundant description.

First Embodiment

Figure 1:
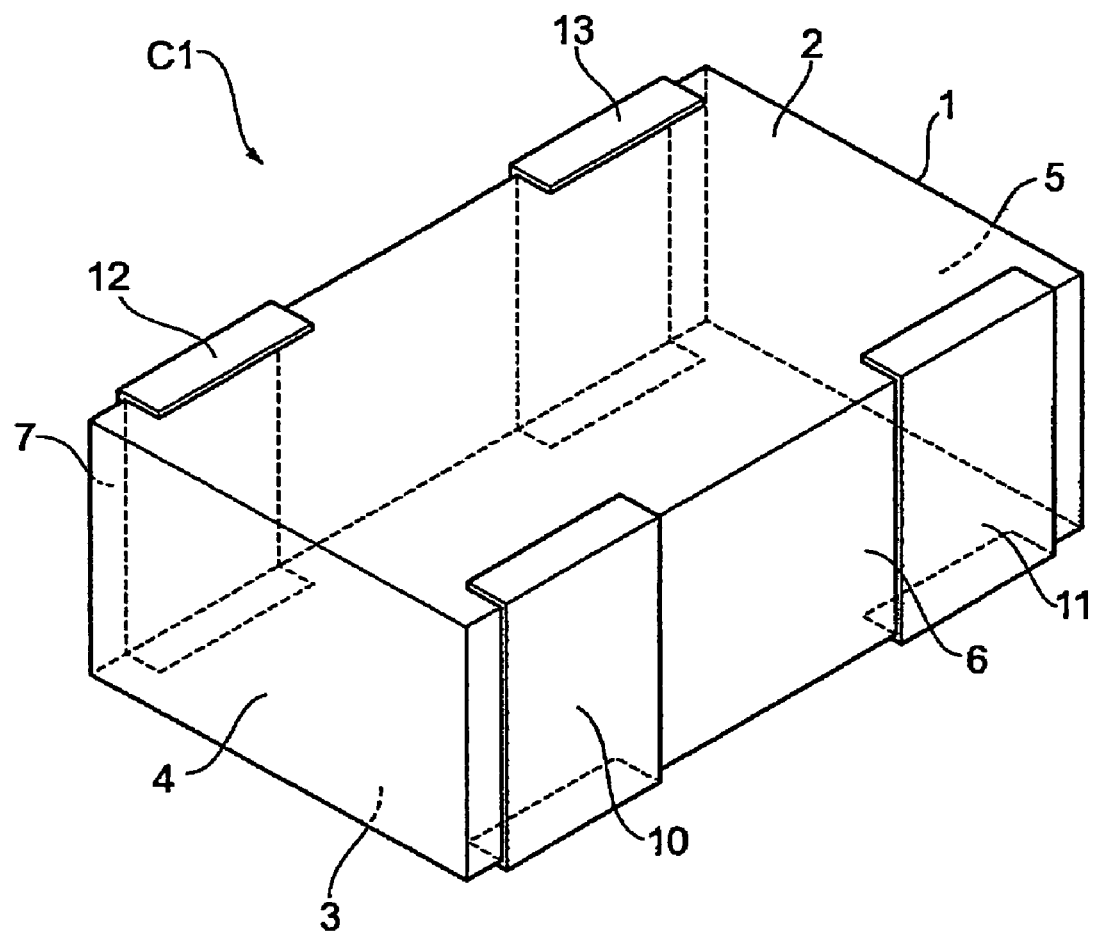
FIG. 1 is a perspective view of a feedthrough multilayer capacitor according to the first embodiment.
Figure 2:
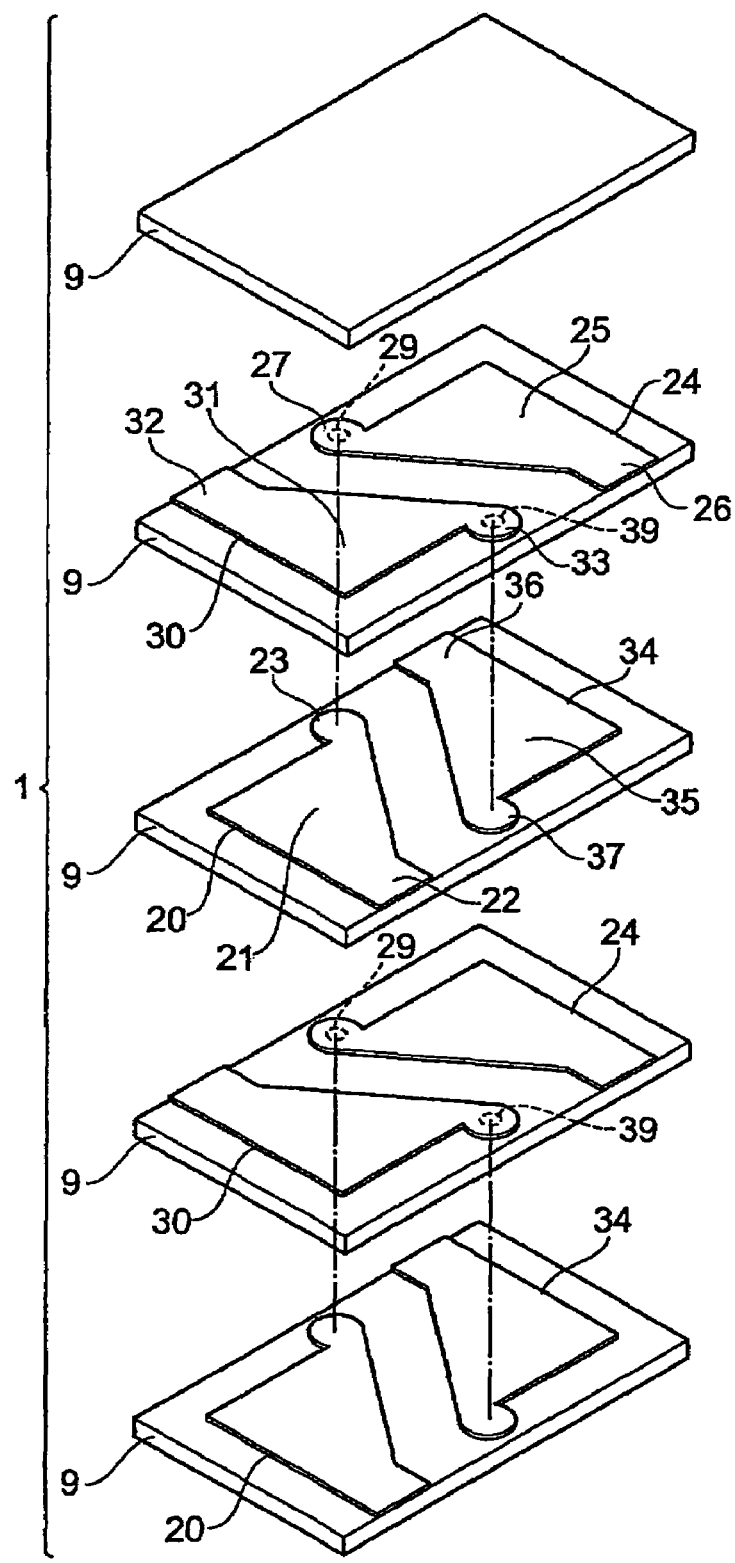
FIG. 2 is an exploded perspective view of a capacitor element body in the feedthrough multilayer capacitor of the first embodiment.
Figure 4:
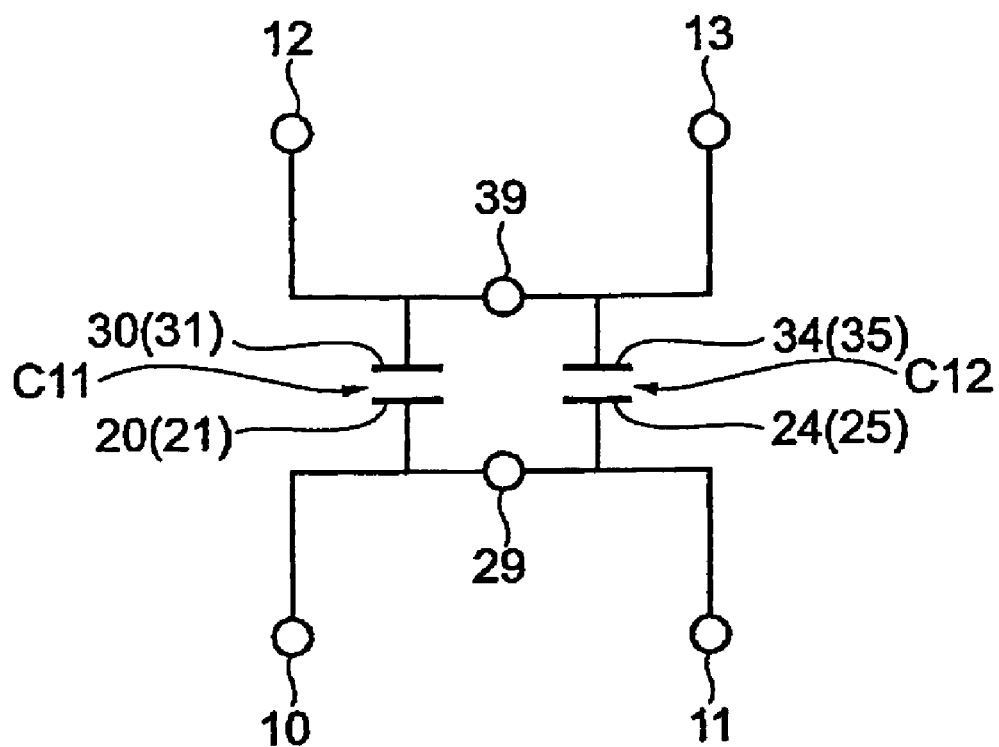
FIG. 4 is an equivalent circuit diagram of the feedthrough multilayer capacitor according to the first embodiment.

A configuration of the feedthrough multilayer capacitor C1 according to the first embodiment will be described with reference to FIGS. 1 to 3. FIG. 1 is a perspective view of the feedthrough multilayer capacitor according to the first embodiment. FIG. 2 is an exploded perspective view of the capacitor element body in the feedthrough multilayer capacitor according to the first embodiment. FIG. 3 is a drawing showing configurations of internal electrodes. FIG. 4 is an equivalent circuit diagram of the feedthrough multilayer capacitor according to the first embodiment.

The feedthrough multilayer capacitor C1, as shown in FIG. 1, is provided with a capacitor element body 1, a first signal terminal electrode 10, a second signal terminal electrode 11, a first ground terminal electrode 12, and a second ground terminal electrode 13.

The capacitor element body 1 is of a nearly rectangular parallelepiped shape and has first and second principal faces 2, 3 of a rectangular shape facing each other, first and second end faces 4, 5 facing each other, and first and second side faces 6, 7. The first and second end faces 4, 5 extend in the transverse direction of the first and second principal faces 2, 3 so as to connect the first and second principal faces 2, 3. The first and second side faces 6, 7 extend in the longitudinal direction of the first and second principal faces 2, 3 so as to connect the first and second principal faces 2, 3. In the first embodiment the second principal face 3 is a mounted surface to be opposed to another component (e.g., a circuit board, an electronic component, or the like).

The capacitor element body 1, as shown in FIG. 2, has a plurality of insulator layers 9. The capacitor element body 1 is composed of a laminate in which the plurality of insulator layers 9 are laminated in the opposed direction of the first and second principal faces 2, 3, and has the dielectric property. Each insulator layer 9 is composed, for example, of a sintered body of a ceramic green sheet containing a dielectric ceramic (a dielectric ceramic such as a $BaTiO_3$ type ceramic, a $Ba(Ti,Zr)O_3$ type ceramic, or a $(Ba, Ca)TiO_3$ type ceramic). The insulator layers 9 are integrally formed in the practical feedthrough multilayer capacitor C1 so that no border can be visually recognized between them.

The first and second signal terminal electrodes 10, 11 are disposed on the first side face 6 of the capacitor element body 1. Each of the first and second signal terminal electrodes 10, 11 is formed so as to cover a portion of the first side face 6 along the opposed direction of the first and second principal faces 2, 3 and extend up to a certain region of the first and second principal faces 2, 3. The first and second signal terminal electrodes 10, 11 are electrically isolated from each other on the surface of the capacitor element body 1.

The first and second ground terminal electrodes 12, 13 are disposed on the second side face 7 of the capacitor element body 1. Each of the first and second ground terminal electrodes 12, 13 is formed so as to cover a portion of the second side face 7 along the opposed direction of the first and second principal faces 2, 3 and extend up to a certain region of the first and second principal faces 2, 3. The first and second ground terminal electrodes 12, 13 are electrically isolated from each other on the surface of the capacitor element body 1.

The first and second signal terminal electrodes 10, 11 are arranged in the order of the first signal terminal electrode 10 and the second signal terminal electrode 11 in the direction from the first end face 4 to the second end face 5 on the first side face 6 of the capacitor element body 1. The first and second ground terminal electrodes 12, 13 are arranged in the order of the first ground terminal electrode 12 and the second ground terminal electrode 13 in the direction from the first end face 4 to the second end face 5 on the second side face 7 of the capacitor element body 1. The first signal terminal electrode 10 and the first ground terminal electrode 12 are opposed in the opposed direction of the first and second side faces 6, 7. The second signal terminal electrode 11 and the second ground terminal electrode 13 are opposed in the opposed direction of the first and second side faces 6, 7.

Each terminal electrode 10-13 is formed, for example, by applying an electroconductive paste containing an electroconductive metal powder and glass frit, onto the exterior of the capacitor element body 1 and baking it. A plated layer is sometimes formed on the terminal electrodes 10-13 after baked, according to need.

The feedthrough multilayer capacitor C1, as shown in FIG. 2, is provided with first signal internal electrodes 20, second signal internal electrodes 24, first ground internal electrodes 30, and second ground internal electrodes 34. The first and second signal internal electrodes 20, 24 and the first and second ground internal electrodes 30, 34 are arranged in the capacitor element body 1. The first and second signal internal electrodes 20, 24 and the first and second ground internal electrodes 30, 34 are made of an electrically conductive material (e.g., a base metal Ni, or the like) usually used as internal electrodes in a multilayer electric element. Each of the first and second signal internal electrodes 20, 24 and the first and second ground internal electrodes 30, 34 is constructed as a sintered body of an electroconductive paste containing the foregoing electrically conductive material.

Each first signal internal electrode 20, as also shown in part (b) in FIG. 3, has a main electrode portion 21, a lead portion 22, and a connection portion 23. The main electrode portion 21, the lead portion 22, and the connection portion 23 are integrally formed. The lead portion 22 extends from the edge of the main electrode portion 21 on the first side face 6 side so that an end thereof is exposed in the first side face 6. The connection portion 23 is located at the edge of the main electrode portion 21 on the second side face 7 side.

The first signal terminal electrode 10 is formed so as to cover all the exposed portion of the lead portion 22 in the first side face 6. The lead portion 22 is physically and electrically connected to the first signal terminal electrode 10. This makes the first signal internal electrode 20 connected to the first signal terminal electrode 10.

Each second signal internal electrode 24, as also shown in part (a) in FIG. 3, has a main electrode portion 25, a lead portion 26, and a connection portion 27. The main electrode portion 25, the lead portion 26, and the connection portion 27 are integrally formed. The lead portion 26 extends from the edge of the main electrode portion 25 on the first side face 6 side so that an end thereof is exposed in the first side face 6. The connection portion 27 is located at the edge of the main electrode portion 25 on the second side face 7 side.

The second signal terminal electrode 11 is formed so as to cover all the exposed portion of the lead portion 26 in the first side face 6. The lead portion 26 is physically and electrically connected to the second signal terminal electrode 11. This makes the second signal internal electrode 24 connected to the second signal terminal electrode 11.

The connection portion 23 and the connection portion 27 overlap at least in portion with each other when viewed from the opposed direction of the first and second principal faces 2, 3 (the laminating direction of the insulator layers 9). A signal throughhole conductor 29 penetrating the insulator layer 9 in the thickness direction is arranged corresponding to the connection portions 23, 27 in the capacitor element body 1. The signal throughhole conductor 29 is located nearer the second side face 7 and is formed as extending in the laminating direction in the capacitor element body 1. An end of the signal throughhole conductor 29 is physically and electrically connected to the connection portion 23 and the other end of the signal throughhole conductor 29 is physically and electrically connected to the connection portion 27. This makes the connection portion 23 and the connection portion 27 electrically connected to each other through the signal throughhole conductor 29. Therefore, the first signal internal electrode 20 and the second signal internal electrode 24 are electrically connected through the signal throughhole conductor 29.

Each first ground internal electrode 30, as also shown in part (a) in FIG. 3, has a main electrode portion 31, a lead portion 32, and a connection portion 33. The main electrode portion 31, the lead portion 32, and the connection portion 33 are integrally formed. The lead portion 32 extends from the edge of the main electrode portion 31 on the second side face 7 side so that an end thereof is exposed in the second side face 7. The connection portion 33 is located at the edge of the main electrode portion 31 on the first side face 6 side.

The first ground terminal electrode 12 is formed so as to cover all the exposed portion of the lead portion 32 in the second side face 7. The lead portion 32 is physically and electrically connected to the first ground terminal electrode 12. This makes the first ground internal electrode 30 connected to the first ground terminal electrode 12.

Each second ground internal electrode 34, as also shown in part (b) in FIG. 3, has a main electrode portion 35, a lead portion 36, and a connection portion 37. The main electrode portion 35, the lead portion 36, and the connection portion 37 are integrally formed. The lead portion 36 extends from the edge of the main electrode portion 35 on the second side face 7 side so that an end thereof is exposed in the second side face 7. The connection portion 37 is located at the edge of the main electrode portion 35 on the first side face 6 side.

The second ground terminal electrode 13 is formed so as to cover all the exposed portion of the lead portion 36 in the second side face 7. The lead portion 36 is physically and electrically connected to the second ground terminal electrode 13. This makes the second ground internal electrode 34 connected to the second ground terminal electrode 13.

The connection portion 33 and the connection portion 37 overlap at least in portion with each other when viewed from the laminating direction of the insulator layers 9. A ground throughhole conductor 39 penetrating the insulator layer 9 in the thickness direction is arranged corresponding to the connection portions 33, 37 in the capacitor element body 1. The ground throughhole conductor 39 is located nearer the first side face 6 and is formed as extending in the laminating direction in the capacitor element body 1. An end of the ground throughhole conductor 39 is physically and electrically connected to the connection portion 33 and the other end of the ground throughhole conductor 39 is physically and electrically connected to the connection portion 37. This makes the connection portion 33 and the connection portion 37 electrically connected to each other through the ground throughhole conductor 39. Therefore, the first ground internal electrode 30 and the second ground internal electrode 34 are electrically connected through the ground throughhole conductor 39.

The main electrode portion 21 of the first signal internal electrode 20 and the main electrode portion 31 of the first ground internal electrode 30 include their respective regions opposed to each other in the laminating direction of the insulator layers 9 so as to sandwich at least one insulator layer 9 being a portion of the capacitor element body 1. Namely, the first signal internal electrode 20 and the first ground internal electrode 30 have their respective regions opposed to each other in the laminating direction of the insulator layers 9 so as to sandwich a portion of the capacitor element body 1. Therefore, an overlap of the insulator layer 9 with the main electrode portion 21 of the first signal internal electrode 20 and the main electrode portion 31 of the first ground internal electrode 30 is a region that substantially produces a capacitance component.

The main electrode portion 25 of the second signal internal electrode 24 and the main electrode portion 35 of the second ground internal electrode 34 include their respective regions opposed to each other so as to sandwich at least one insulator layer 9 being a portion of the capacitor element body 1. Namely, the second signal internal electrode 24 and the second ground internal electrode 34 have their respective regions opposed to each other so as to sandwich a portion of the capacitor element body 1. Therefore, an overlap of the insulator layer 9 with the main electrode portion 25 of the second signal internal electrode 24 and the main electrode portion 35 of the second ground internal electrode 34 is a region that substantially produces a capacitance component.

The first signal internal electrode 20 and the second ground internal electrode 34 are not opposed in the laminating direction of the insulator layers 9. This results in producing no substantial capacitance component between the first signal internal electrode 20 and the second ground internal electrode 34. In the first embodiment the first signal internal electrode 20 and the second ground internal electrode 34 are located in the same layer and with a predetermined gap in the opposed direction of the first and second end faces 4, 5. The first signal internal electrode 20 and the second signal internal electrode 24 are located in respective different layers.

The second signal internal electrode 24 and the first ground internal electrode 30 are not opposed in the laminating direction of the insulator layers 9. This results in producing no substantial capacitance component between the second signal internal electrode 24 and the first ground internal electrode 30. In the first embodiment the second signal internal electrode 24 and the first ground internal electrode 30 are located in the same layer and with a predetermined gap in the opposed direction of the first and second end faces 4, 5. The first ground internal electrode 30 and the second ground internal electrode 34 are located in respective different layers.

In the first embodiment the feedthrough multilayer capacitor C1 is provided with an internal electrode group including the first signal internal electrodes 20 and the first ground internal electrodes 30, and another internal electrode group including the second signal internal electrodes 24 and the second ground internal electrodes 34. The first signal internal electrode 20 and the second signal internal electrode 24 are electrically connected to each other through the signal throughhole conductor 29 and the first ground internal electrode 30 and the second ground internal electrode 34 are electrically connected to each other through the ground throughhole conductor 39. The foregoing two internal electrode groups are juxtaposed in the opposed direction of the first and second end faces 4, 5 in the capacitor element body 1.

The signal throughhole conductor 29 and the ground throughhole conductor 39 are separated in the opposed direction of the first side face 6 and the second side face 7. Each of the throughhole conductors 29, 39 is made of an electrically conductive material (e.g., a base metal Ni, or the like) usually used as internal electrodes in a multilayer electric element, as the internal electrodes 20, 24, 30, 34 are. Each throughhole conductor 29, 39 is constructed as a sintered body of an electroconductive paste containing the foregoing electrically conductive material.

Figure 5:
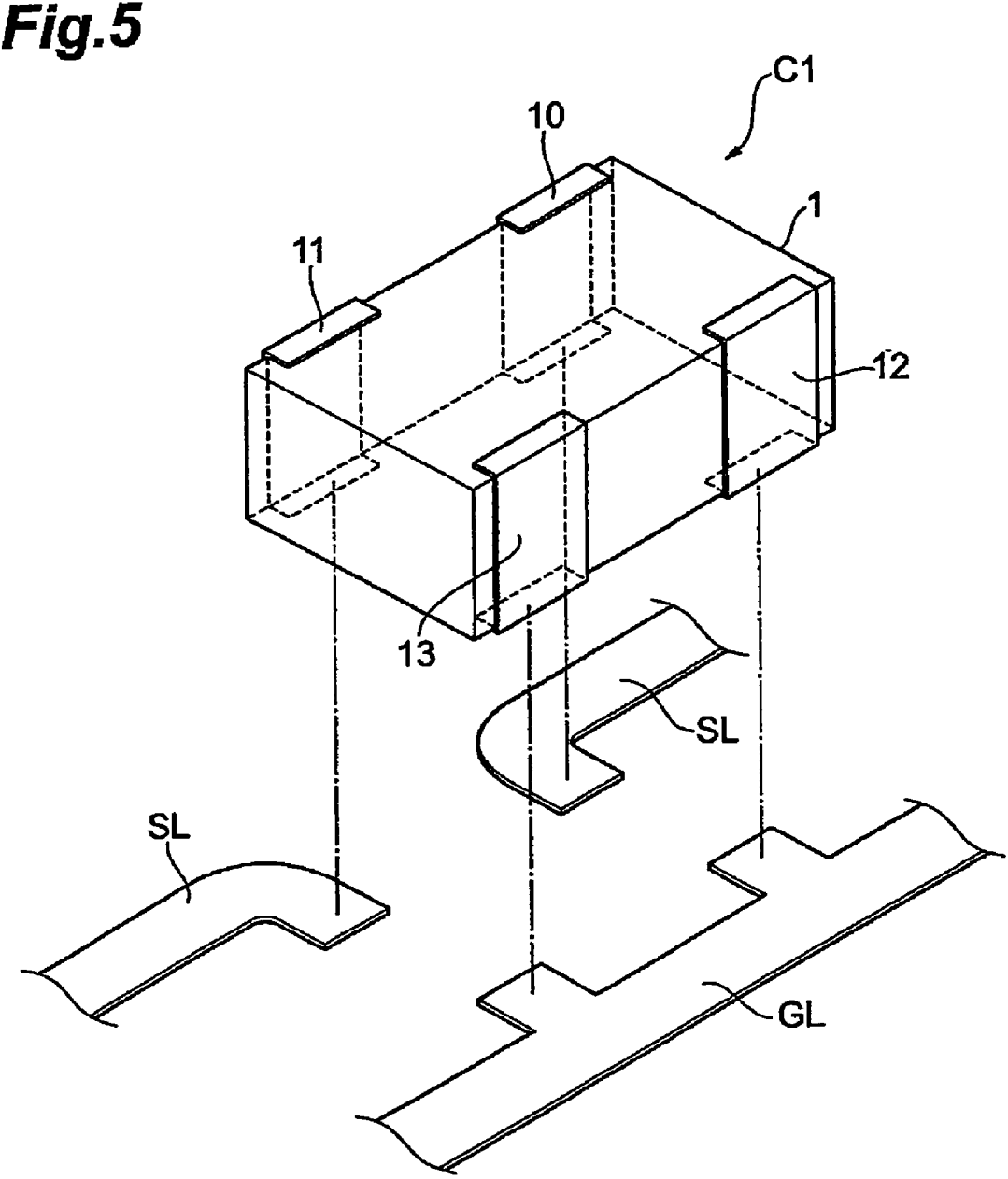
FIG. 5 is a drawing showing a state in which the feedthrough multilayer capacitor of the first embodiment is mounted on another component.

In the feedthrough multilayer capacitor C1, as shown in FIG. 4, there are capacitance components C11, C12 formed by the respective internal electrode groups described above. Namely, the capacitance component C1 is made by the opposed regions of the main electrode portions 21 of the first signal internal electrodes 20 and the main electrode portions 31 of the first ground internal electrodes 30. The capacitance component C12 is made by the opposed regions of the main electrode portions 25 of the second signal internal electrodes 24 and the main electrode portions 35 of the second ground internal electrodes 34. The feedthrough multilayer capacitor C1 is mounted on another component, as shown in FIG. 5, in such a manner that the first and second signal terminal electrodes 10, 11 are connected to a signal line SL and that the first and second ground terminal electrodes 12, 13 are connected to a ground line GL.

As described above, the first embodiment successfully realizes a circuit in which a capacitor with the capacitance component C11 and a capacitor with the capacitance component C12 are connected in parallel.

In the first embodiment the first signal internal electrode 20 and the second ground internal electrode 34 are located in the same layer and the second signal internal electrode 24 and the first ground internal electrode 30 are located in the same layer. This configuration decreases the number of layers of internal electrodes and thus permits the feedthrough multilayer capacitor C1 to be constructed in a lower profile.

In the first embodiment the first and second signal terminal electrodes 10, 11 are disposed on the first side face 6 and the first and second ground terminal electrodes 12, 13 are disposed on the second side face 7. The signal throughhole conductor 29 is located nearer the second side face 7 and the ground throughhole conductor nearer the first side face 6. This makes the signal throughhole conductor 29 and the ground throughhole conductor 39 arranged as separated from each other, whereby a physically sufficiently large space is secured between the signal throughhole conductor 29 and the ground throughhole conductor 39. As a result, the two capacitance components C11, C12 can be formed as more suitably separated from each other.

Figure 6:
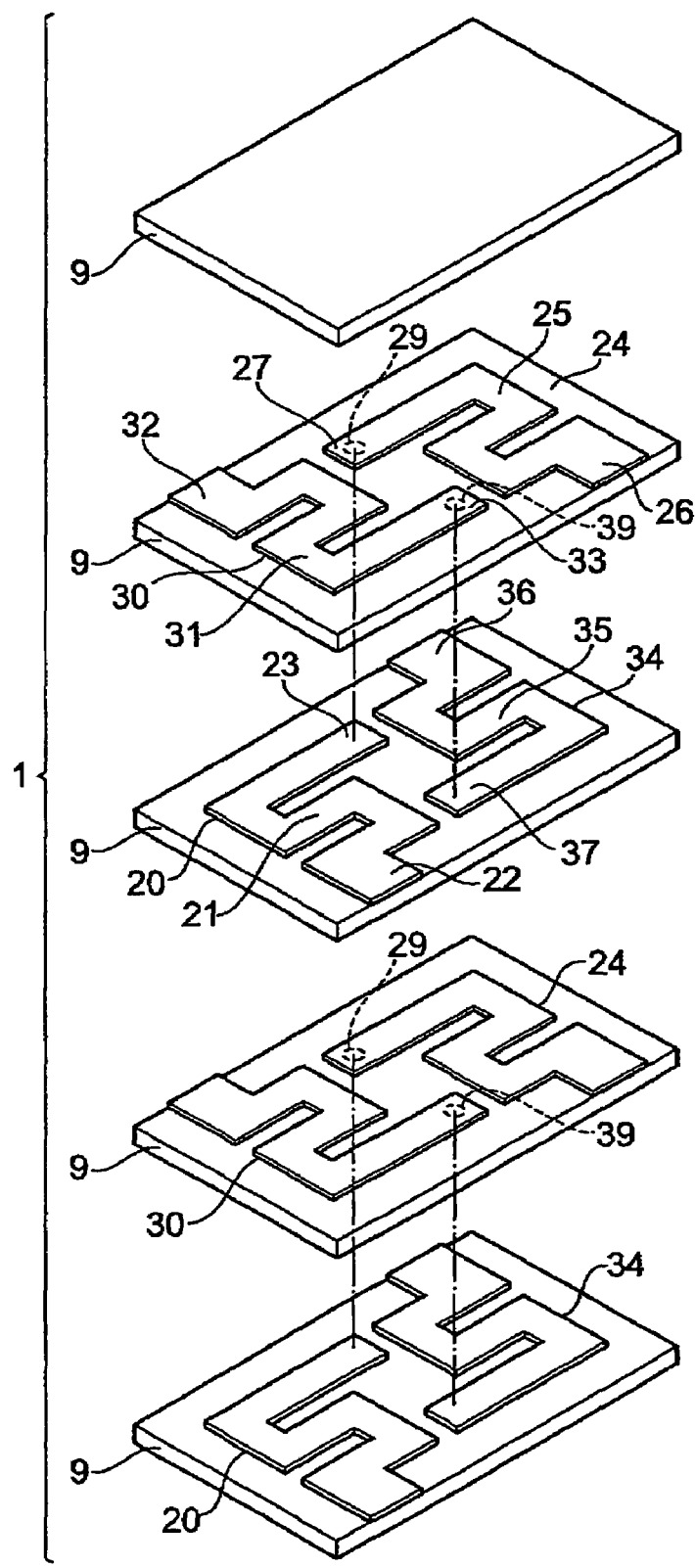
FIG. 6 is an exploded perspective view showing a capacitor element body in a feedthrough multilayer capacitor according to a modification example of the first embodiment.
Figure 8:
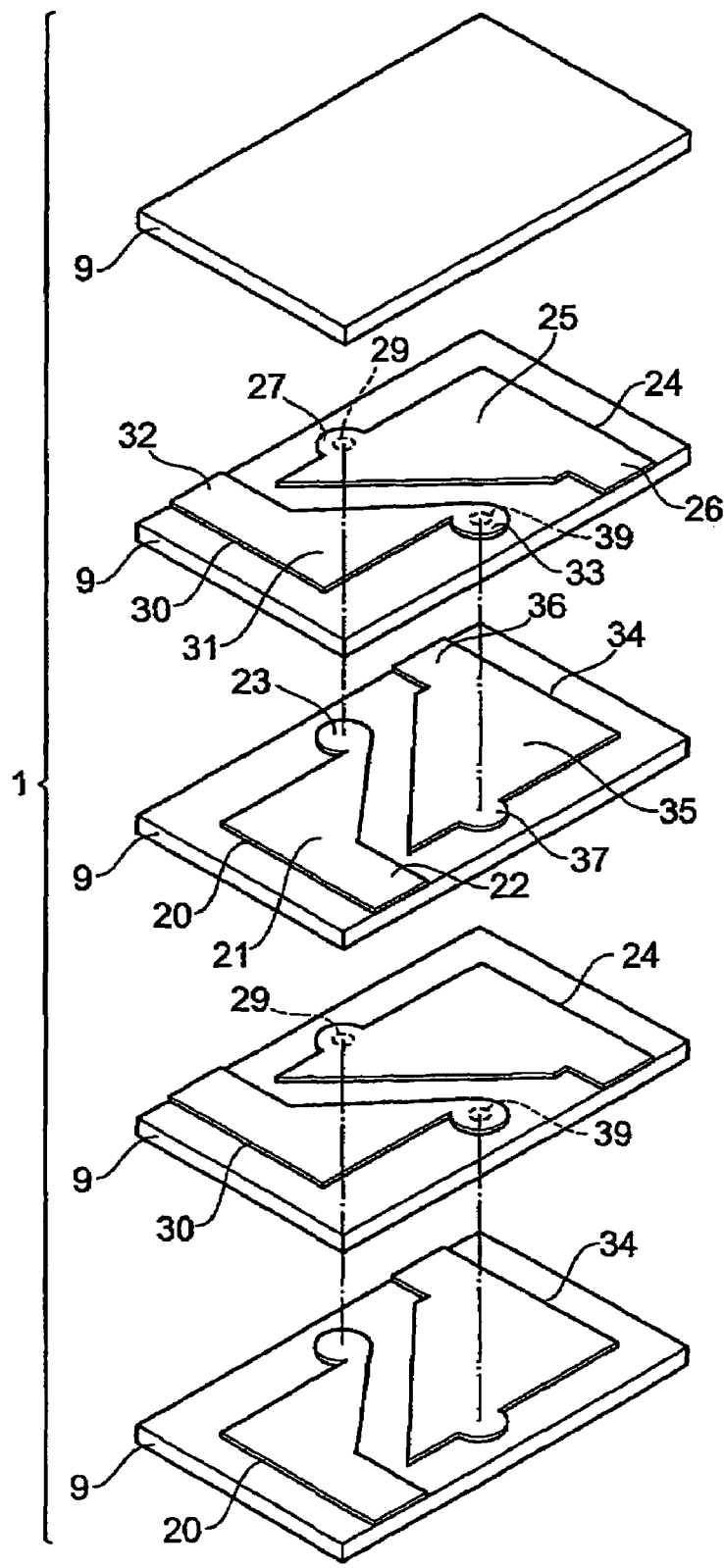
FIG. 8 is an exploded perspective view showing a capacitor element body in a feedthrough multilayer capacitor according to another modification example of the first embodiment.

The feedthrough multilayer capacitors C1 according to modification examples of the first embodiment will be described below on the basis of FIGS. 6 to 9. The feedthrough multilayer capacitors of the modification examples are different in the shapes of the first and second signal internal electrodes 20, 24 and the first and second ground internal electrodes 30, 34 from the feedthrough multilayer capacitor C1 of the above-described embodiment. Each of FIGS. 6 and 8 is an exploded perspective view showing the capacitor element body in the feedthrough multilayer capacitor according to the modification example of the first embodiment. Each of FIG. 7 and FIG. 9 is a drawing showing configurations of the internal electrodes.

In the modification example shown in FIGS. 6 and 7, each of the main electrode portions 21, 25, 31, 35 of the first and second signal internal electrodes 20, 24 and the first and second ground internal electrodes 30, 34 is of a meander shape. Since each main electrode portion 21, 25, 31, 35 has a smaller width and a longer path length, the first and second signal internal electrodes 20, 24 and the first and second ground internal electrodes 30, 34 come to have a relatively large electric resistance. As a result, the feedthrough multilayer capacitor can have large impedance.

In the modification example shown in FIGS. 8 and 9, the area of the opposed regions of the main electrode portion 21 of the first signal internal electrode 20 and the main electrode portion 31 of the first ground internal electrode 30 is different from the area of the opposed regions of the main electrode portion 25 of the second signal internal electrode 24 and the main electrode portion 35 of the second ground internal electrode 34. In the first embodiment the area of the opposed regions of the main electrode portion 21 of the first signal internal electrode 20 and the main electrode portion 31 of the first ground internal electrode 30 is smaller than the area of the opposed regions of the main electrode portion 25 of the second signal internal electrode 24 and the main electrode portion 35 of the second ground internal electrode 34. Therefore, the capacitance component C11 is smaller than the capacitance component C12.

Figure 10:
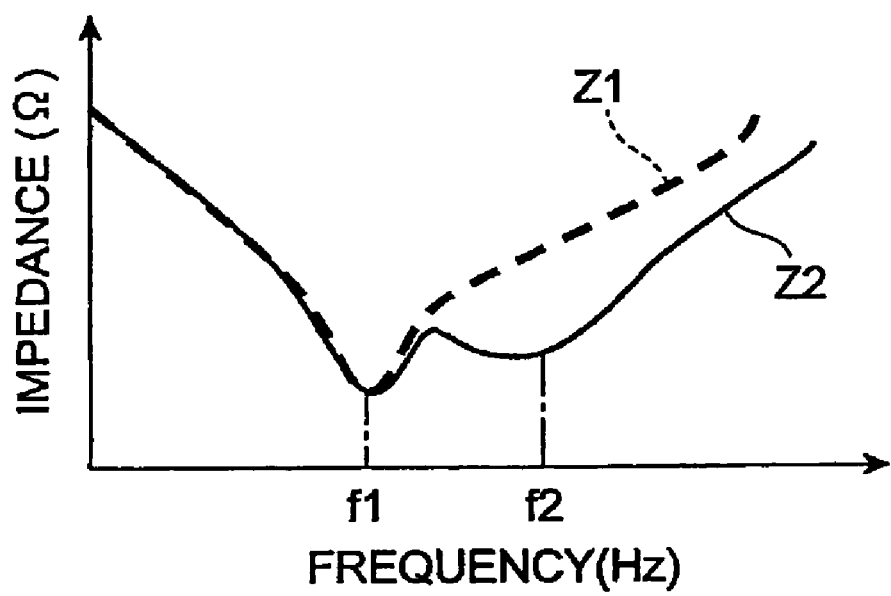
FIG. 10 is a graph showing frequency characteristics of impedance of the feedthrough multilayer capacitors according to the first embodiment and the modification example thereof.

FIG. 10 shows a graph of impedance ($\Omega$) characteristics against frequency (Hz) of each of the feedthrough multilayer capacitor C1 of the first embodiment and the feedthrough multilayer capacitor of the modification example shown in FIGS. 8 and 9. In the graph shown in FIG. 10, the horizontal axis represents frequency (Hz) and the vertical axis impedance ($\Omega$). The characteristic Z1 indicated by a dashed line in FIG. 10 corresponds to the feedthrough multilayer capacitor C1 of the first embodiment and the characteristic Z2 indicated by a solid line corresponds to the feedthrough multilayer capacitor of the modification example shown in FIGS. 8 and 9.

In the feedthrough multilayer capacitor C1 of the first embodiment, as indicated by the characteristic Z1 in FIG. 10, the two capacitance components formed in the capacitor have the same capacitance value and thus the capacitor has a minimum point of impedance only at the self-resonant frequency f1 corresponding to the capacitance. On the other hand, in the feedthrough multilayer capacitor of the modification example shown in FIGS. 8 and 9, as indicated by the characteristic Z2 in FIG. 10, the two capacitance components formed in the capacitor have different capacitance values and thus the capacitor has minimum points of impedance at different self-resonant frequencies f1, f2. Since the feedthrough multilayer capacitor of the modification example shown in FIGS. 8 and 9 has the two different capacitance components as described above, the impedance can be kept low over a wide frequency band, when compared with the feedthrough multilayer capacitors with one capacitance.

Second Embodiment

Figure 11:
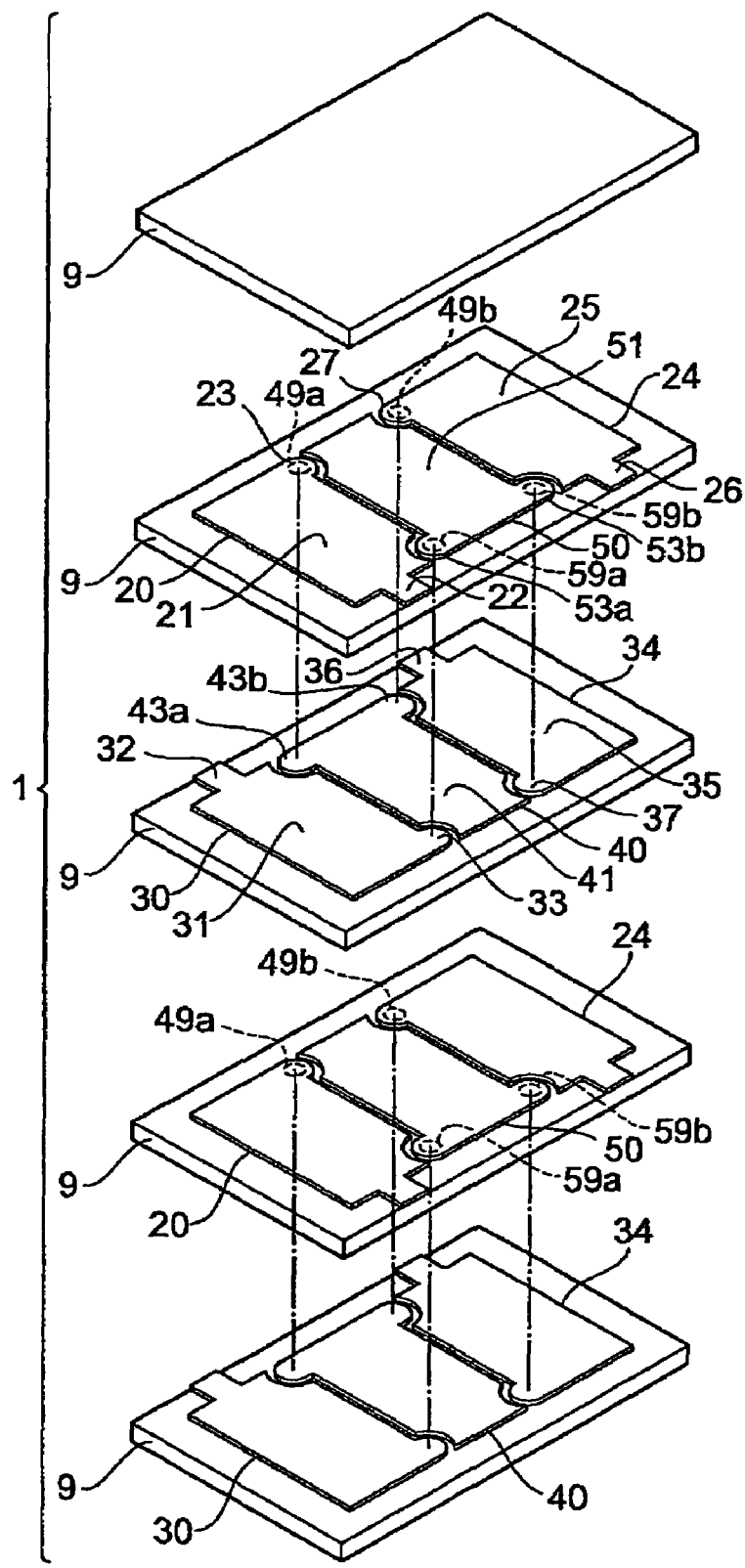
FIG. 11 is an exploded perspective view of a capacitor element body in the feedthrough multilayer capacitor according to the second embodiment.
Figure 12:
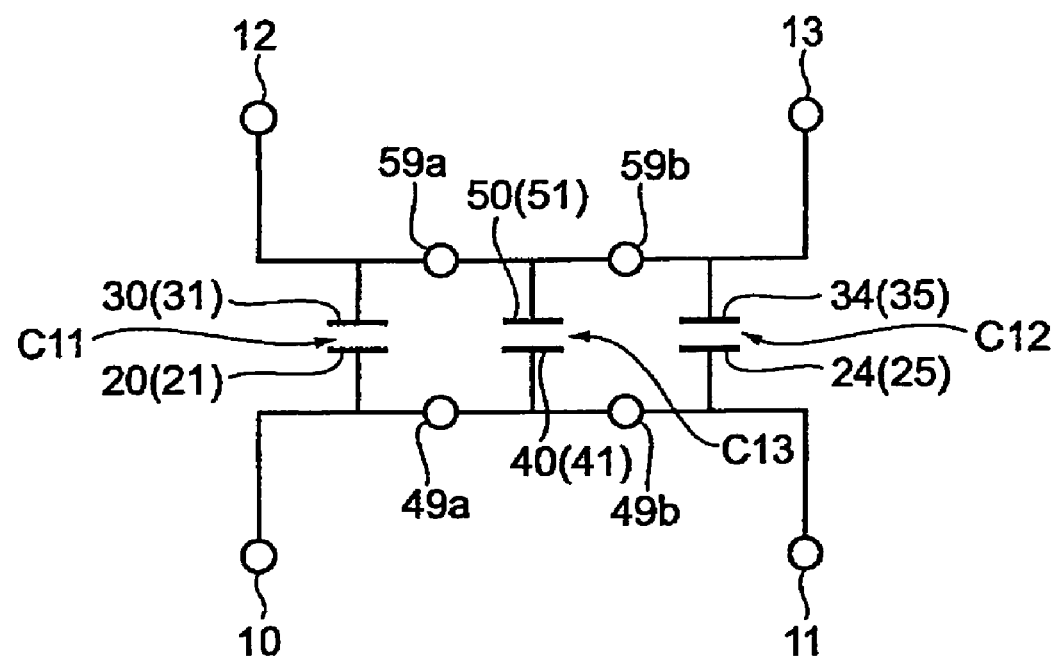
FIG. 12 is an equivalent circuit diagram of the feedthrough multilayer capacitor according to the second embodiment.

A configuration of the feedthrough multilayer capacitor according to the second embodiment will be described below with reference to FIGS. 11 and 12. FIG. 11 is an exploded perspective view of the capacitor element body in the feedthrough multilayer capacitor according to the second embodiment FIG. 12 is an equivalent circuit diagram of the feedthrough multilayer capacitor according to the second embodiment.

The feedthrough multilayer capacitor of the second embodiment is also provided with a capacitor element body 1, a first signal terminal electrode 10, a second signal terminal electrode 11, a first ground terminal electrode 12, and a second ground terminal electrode 13, which are not shown, as the feedthrough multilayer capacitor C1 of the first embodiment is.

The feedthrough multilayer capacitor of the second embodiment, as shown in FIG. 11, is provided with first signal internal electrodes 20, second signal internal electrodes 24, third signal internal electrodes 40, first ground internal electrodes 30, second ground internal electrodes 34, and third ground internal electrodes 50. The internal electrodes 20, 24, 30, 34, 40, 50 are arranged in the capacitor element body 1. The third signal internal electrodes 40 and the third ground internal electrodes 50 are also made of an electrically conductive material (e.g., a base metal Ni, or the like) usually used as internal electrodes in a multilayer electric element, as the internal electrodes 20, 24, 30, 34 are. Each internal electrode 20, 24, 30, 34, 40, 50 is constructed as a sintered body of an electroconductive paste containing the foregoing electrically conductive material.

Each first signal internal electrode 20 has a main electrode portion 21, a lead portion 22, and a connection portion 23. The first signal internal electrode 20 is connected to the first signal terminal electrode 10. Each second signal internal electrode 24 has a main electrode portion 25, a lead portion 26, and a connection portion 27. The second signal internal electrode 24 is connected to the second signal terminal electrode 11.

Each third signal internal electrode 40 has a main electrode portion 41, and two connection portions 43a, 43b. The main electrode portion 41 and the two connection portions 43a, 43b are integrally formed. The connection portions 43a, 43b are located at a region of the main electrode portion 41 nearer to the second side face 7.

The connection portion 23 and the connection portion 43a overlap at least in portion with each other when viewed from the laminating direction of the insulator layers 9. A signal throughhole conductor 49a penetrating the insulator layer 9 in the thickness direction is arranged corresponding to the connection portions 23, 43a in the capacitor element body 1. The signal throughhole conductor 49a is located nearer the second side face 7 and is formed as extending in the laminating direction in the capacitor element body 1. An end of the signal throughhole conductor 49a is physically and electrically connected to the connection portion 23 and the other end of the signal throughhole conductor 49a is physically and electrically connect to the connection portion 43a. This makes the connection portion 23 and the connection portion 43a electrically connected to each other through the signal throughhole conductor 49a.

The connection portion 43b and the connection portion 27 overlap at least in portion with each other when viewed from the laminating direction of the insulator layers 9. A signal throughhole conductor 49b penetrating the insulator layer 9 in the thickness direction is arranged corresponding to the connection portions 27, 43b in the capacitor element body 1. The signal throughhole conductor 49b is located nearer the second side face 7 and is formed as extending in the laminating direction in the capacitor element body 1. An end of the signal throughhole conductor 49b is physically and electrically connected to the connection portion 43b and the other end of the signal throughhole conductor 49b is physically and electrically connected to the connection portion 27. This makes the connection portion 43b and the connection portion 27 electrically connected to each other through the signal throughhole conductor 49b.

Each first ground internal electrode 30 has a main electrode portion 31, a lead portion 32, and a connection portion 33. The first ground internal electrode 30 is connected to the first ground terminal electrode 12. Each second ground internal electrode 34 has a main electrode portion 35, a lead portion 36, and a connection portion 37. The second ground internal electrode 34 is connected to the second ground terminal electrode 13.

Each third ground internal electrode 50 has a main electrode portion 51 and two connection portions 53a, 53b. The main electrode portion 51 and the two connection portions 53a, 53b are integrally formed. The connection portions 53a, 53b are located at a region of the main electrode portion 51 nearer to the first side face 6.

The connection portion 33 and the connection portion 53a overlap at least in portion with each other when viewed from the laminating direction of the insulator layers 9. A ground throughhole conductor 59a penetrating the insulator layer 9 in the thickness direction is arranged corresponding to the connection portions 33, 53a in the capacitor element body 1. The ground throughhole conductor 59a is located nearer the first side face 6 and is formed as extending in the laminating direction in the capacitor element body 1. An end of the ground throughhole conductor 59a is physically and electrically connected to the connection portion 33 and the other end of the ground throughhole conductor 59a is physically and electrically connected to the connection portion 53a. This makes the connection portion 33 and the connection portion 53a electrically connected to each other through the ground throughhole conductor 59a.

The connection portion 53b and the connection portion 37 overlap at least in portion with each other when viewed from the laminating direction of the insulator layers 9. A ground throughhole conductor 59b penetrating the insulator layer 9 in the thickness direction is arranged corresponding to the connection portions 37, 53b in the capacitor element body 1. The ground throughhole conductor 59b is located nearer the first side face 6 and is formed as extending in the laminating direction in the capacitor element body 1. An end of the ground throughhole conductor 59b is physically and electrically connected to the connection portion 53b and the other end of the ground throughhole conductor 59b is physically and electrically connected to the connection portion 37. This makes the connection portion 53b and the connection portion 37 electrically connected to each other through the ground throughhole conductor 59b.

The first to third signal internal electrodes 20, 24, 40 are electrically connected to each other through the signal throughhole conductors 49a, 49b. The first to third ground internal electrodes 30, 34, 50 are electrically connected to each other through the ground throughhole conductors 59a, 59b. The signal throughhole conductors 49a, 49b and the ground throughhole conductors 59a, 59b are separated from each other in the opposed direction of the first side face 6 and the second side face 7. Each throughhole conductor 49a, 49b, 59a, 59b is made of an electrically conductive material (e.g., a base metal Ni, or the like) usually used as internal electrodes in a multilayer electric element, as each throughhole conductor 29, 39 was. Each throughhole conductor 49a, 49b, 59a, 59b is constructed as a sintered body of an electroconductive paste containing the foregoing electrically conductive material.

The main electrode portion 41 of the third signal internal electrode 40 and the main electrode portion 51 of the third ground internal electrode 50 include their respective regions opposed to each other in the laminating direction of the insulator layers 9 so as to sandwich at least one insulator layer 9 being a portion of the capacitor element body 1. Namely, the third signal internal electrode 40 and the third ground internal electrode 50 have their respective regions opposed to each other in the laminating direction of the insulator layers 9 so as to sandwich a portion of the capacitor element body 1. Therefore, an overlap of the insulator layer 9 with the main electrode portion 41 of the third signal internal electrode 40 and the main electrode portion 51 of the third ground internal electrode 50 is also a region that substantially produces a capacitance component.

The first signal internal electrode 20, the third ground internal electrode 50, and the second signal internal electrode 24 are located in the same layer. The internal electrodes 20, 24, 50 are arranged with a predetermine gap between them and in the order of the first signal internal electrode 20, the third ground internal electrode 50, and the second signal internal electrode 24 in the direction from the first end face 4 to the second end ace 5.

The first ground internal electrode 30, the third signal internal electrode 40, and the second ground internal electrode 34 are located in the same layer. The internal electrodes 30, 34, 40 are arranged with a predetermine gap between them and in the order of the first ground internal electrode 30, the third signal internal electrode 40, and the second ground internal electrode 34 in the direction from the first end face 4 to the second end face 5.

The first signal internal electrode 20 is not opposed to the second and third ground internal electrodes 34, 50 in the laminating direction of the insulator layers 9. This results in producing no substantial capacitance component between the first signal internal electrode 20 and the second and third ground internal electrodes 34, 50.

The second signal internal electrode 24 is not opposed to the first and third ground internal electrodes 30, 50 in the laminating direction of the insulator layers 9. This results in producing no substantial capacitance component between the second signal internal electrode 24 and the first and third ground internal electrodes 30, 50.

The third signal internal electrode 40 is not opposed to the first and second ground internal electrodes 30, 34 in the laminating direction of the insulator layers 9. This results in producing no substantial capacitance component between the second signal internal electrode 24 and the first and second ground internal electrodes 30, 34.

The feedthrough multilayer capacitor of the second embodiment is provided with an internal electrode group including the first signal internal electrodes 20 and the first ground internal electrodes 30, another internal electrode group including the second signal internal electrodes 24 and the second ground internal electrodes 34, and still another internal electrode group including the third signal internal electrodes 40 and the third ground internal electrodes 50. The electrical connections among the first signal internal electrode 20, the second signal internal electrode 24, and the third signal internal electrode 40 are made by the signal throughhole conductors 49a, 49b, and the electrical connections among the first ground internal electrode 30, the second ground internal electrode 34, and the third ground internal electrode 50 are made by the ground throughhole conductors 59a, 59b. The aforementioned three internal electrode groups are juxtaposed in the opposed direction of the first and second end faces 4, 5 in the capacitor element body 1.

In the feedthrough multilayer capacitor of the second embodiment, as shown in FIG. 12, there are capacitance components C11, C12, C13 formed by the respective internal electrode groups described above. Namely, the capacitance component C11 is made by the opposed regions of the main electrode portions 21 of the first signal internal electrodes 20 and the main electrode portions 31 of the first ground internal electrodes 30. The capacitance component C12 is made by the opposed regions of the main electrode portions 25 of the second signal internal electrodes 24 and the main electrode portions 35 of the second ground internal electrodes 34. The capacitance component C13 is made by the opposed regions of the main electrode portions 41 of the third signal internal electrodes 40 and the main electrode portions 51 of the third ground internal electrodes 50.

As described above, the second embodiment also successfully realizes a circuit in which the following capacitors are connected in parallel: a capacitor with the capacitance component C11; a capacitor with the capacitance component C12; a capacitor with the capacitance component C13.

Figure 13:
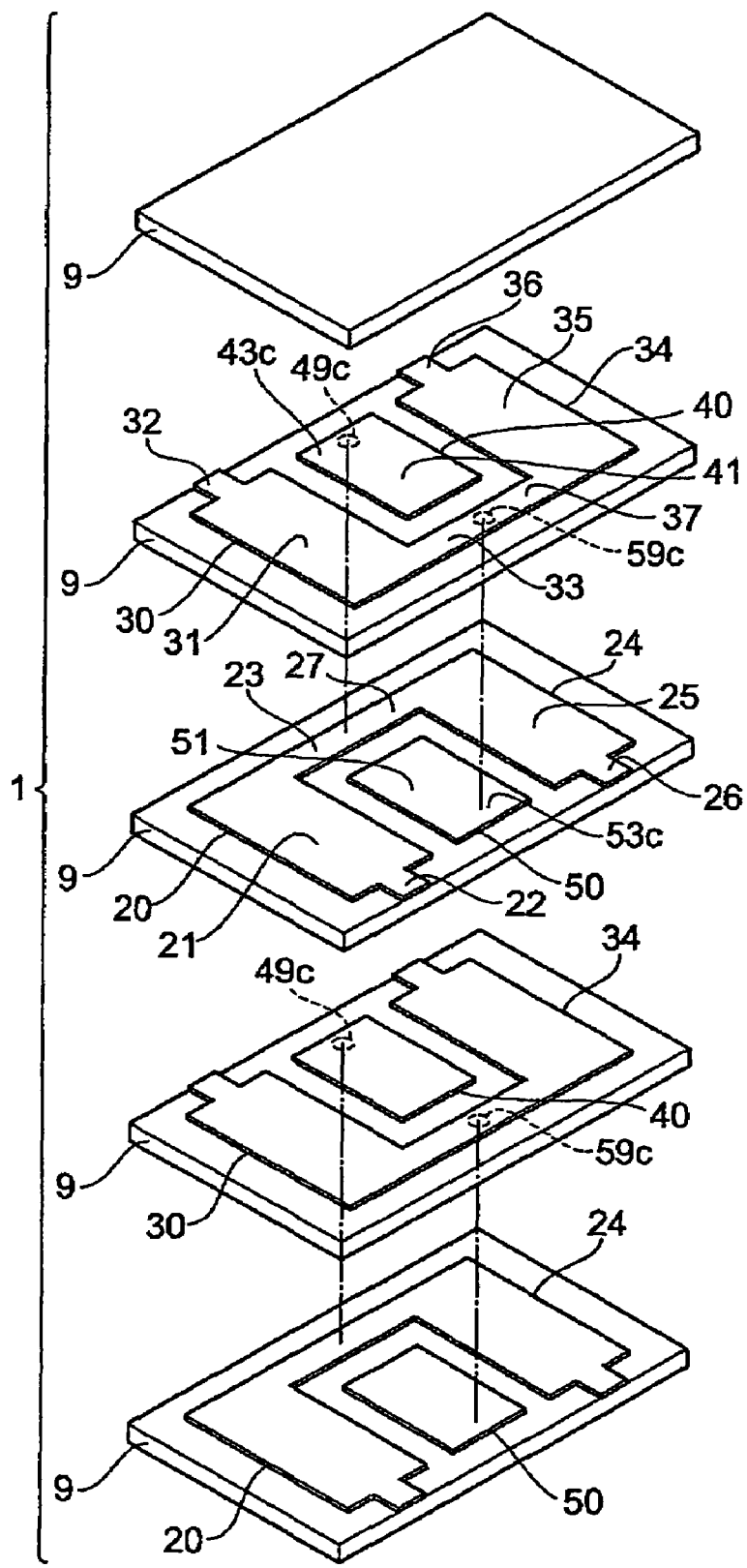
FIG. 13 is an exploded perspective view of a capacitor element body in a feedthrough multilayer capacitor according to a modification example of the second embodiment.

The feedthrough multilayer capacitor according to a modification example of the second embodiment will be described below on the basis of FIG. 13. The feedthrough multilayer capacitor of the present modification example is different in the electrical connection form among the signal internal electrodes 20, 24, 40 and the electrical connection form among the ground internal electrodes 30, 34, 50 from the feedthrough multilayer capacitor of the above-described second embodiment. FIG. 13 is an exploded perspective view showing the capacitor element body in the feedthrough multilayer capacitor according to the modification example of the second embodiment.

The connection portion 23 of the first signal internal electrode 20 and the connection portion 27 of the second signal internal electrode 24 are integrally formed. The connection portions 23, 27 function as coupling conductors to couple the main electrode portion 21 to the main electrode portion 25. The main electrode portion 21 and the main electrode portion 25 are electrically connected through the connection portions 23, 27.

Each third signal internal electrode 40 has a main electrode portion 41 and a connection portion 43c. The main electrode portion 41 and the connection portion 43c are integrally formed. The connection portion 43c is located at a region of the main electrode portion 41 nearer to the second side face 7.

The connection portions 23, 27 and the connection portion 43c overlap at least in portion with each other when viewed from the laminating direction of the insulator layers 9. A signal throughhole conductor 49c penetrating the insulator layer 9 in the thickness direction is arranged corresponding to the connection portions 23, 27, 43c in the capacitor element body 1. The signal throughhole conductor 49c is located nearer the second side face 7 and is formed as extending in the laminating direction in the capacitor element body 1. An end of the signal throughhole conductor 49c is physically and electrically connected to the connection portions 23, 27 and the other end of the signal throughhole conductor 49c is physically and electrically connected to the connection portion 43c. This makes the connection portions 23, 27 and the connection portion 43c electrically connected to each other through the signal throughhole conductor 49c.

The connection portion 33 of the first ground internal electrode 30 and the connection portion 37 of the second ground internal electrode 34 are integrally formed. The connection portions 33, 37 function as coupling conductors to couple the main electrode portion 31 to the main electrode portion 35. The main electrode portion 31 and the main electrode portion 35 are electrically connected through the connection portions 33, 37.

Each third ground internal electrode 50 has a main electrode portion 51 and a connection portion 53c. The main electrode portion 51 and the connection portion 53c are integrally formed. The connection portion 53c is located at a region of the main electrode portion 51 nearer to the first side face 6.

The connection portions 33, 37 and the connection portion 53c overlap at least in portion when viewed from the laminating direction of the insulator layers 9. A ground throughhole conductor 59c penetrating the insulator layer 9 in the thickness direction is arranged corresponding to the connection portions 33, 37, 53c in the capacitor element body 1. The ground throughhole conductor 59c is located nearer the first side face 6 and is formed as extending in the laminating direction in the capacitor element body 1. An end of the ground throughhole conductor 59c is physically and electrically connected to the connection portion 53c and the other end of the ground throughhole conductor 59c is physically and electrically connected to the connection portions 33, 37. This makes the connection portions 33, 37 and the connection portion 53c electrically connected to each other through the ground throughhole conductor 59c.

The signal throughhole conductor 49c and the ground throughhole conductor 59c are separated from each other in the opposed direction of the first side face 6 and the second side face 7. Each throughhole conductor 49c, 59c is also made of an electrically conductive material (e.g., a base metal Ni, or the like) usually used as internal electrodes in a multilayer electric element, as each throughhole conductor 29, 39 was. Each throughhole conductor 49c, 59c is constructed as a sintered body of an electroconductive paste containing the foregoing electrically conductive material.

An electrical connection between the first signal internal electrode 20 and the second signal internal electrode 24 is made by the connection portions 23, 27. An electrical connection between the first signal internal electrode 20 and the third signal internal electrode 40 and an electrical connection between the second signal internal electrode 24 and the third signal internal electrode 40 are made by the signal throughhole conductor 49c. An electrical connection between the first ground internal electrode 30 and the second ground internal electrode 34 is made by the connection portions 33, 37. An electrical connection between the first ground internal electrode 30 and the third ground internal electrode 50 and an electrical connection between the second ground internal electrode 34 and the third ground internal electrode 50 are made by the ground throughhole conductor 59c.

Figure 14:
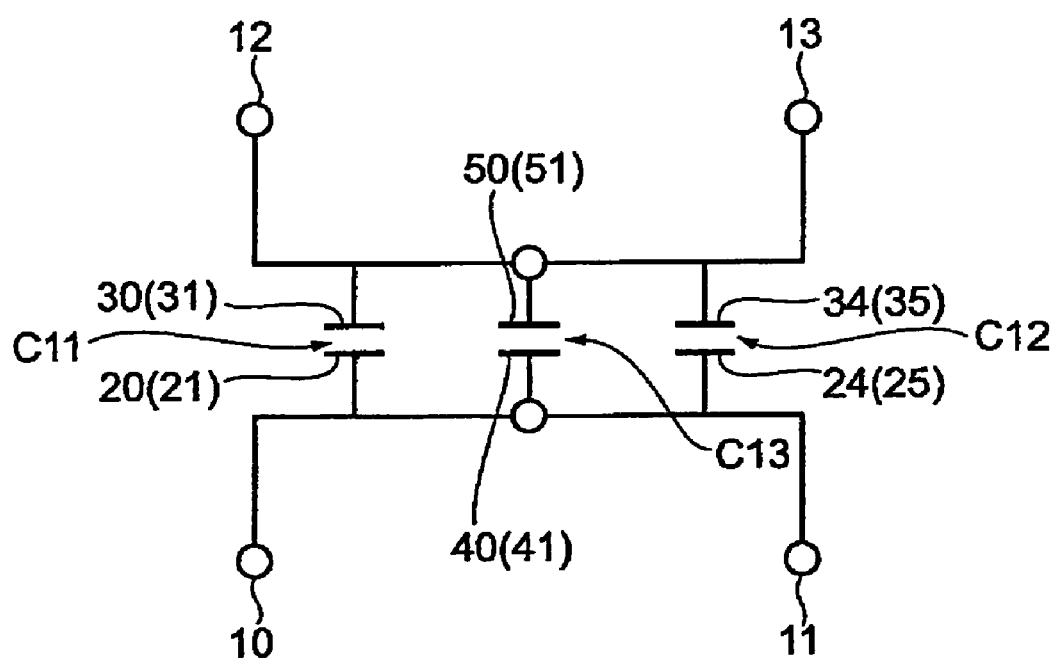
FIG. 14 is an equivalent circuit diagram of the feedthrough multilayer capacitor according to the modification example of the second embodiment.

In the feedthrough multilayer capacitor of the modification example shown in FIG. 13, there are also capacitance components C11, C12, C13 formed by the respective internal electrode groups described above, as shown in FIG. 14.

As described above, the present modification example also successfully realizes a circuit in which the following capacitors are connected in parallel: a capacitor with the capacitance component C11; a capacitor with the capacitance component C12; a capacitor with the capacitance component C13.

The above described the preferred embodiments of the present invention, but it is noted that the present invention is not always limited to the above-described embodiments but can be modified in various ways without departing from the scope of the invention.

The number of the laminated insulator layers 9 and the number of the laminated layers of the internal electrodes 20, 24, 30, 34, 40, 50 in the capacitor element body 1 are not limited to the numbers described in the above embodiments and modification examples. The number of internal electrode groups is not limited to the numbers described in the above embodiments, either.

The shapes of the respective internal electrodes 20, 24, 30, 34, 40, 50 are not limited to the shapes described in the above embodiments and modification examples. In the second embodiment, therefore, the shape of each internal electrode 20, 24, 30, 34, 40, 50 may be of a meander shape and the areas may be different among the opposed regions of the main electrode portions 21, 25, 41 of the signal internal electrodes 20, 24, 40 and the main electrode portions 31, 35, 51 of the ground internal electrodes 30, 34, 50.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A feedthrough multilayer capacitor comprising:
    a capacitor element body with a dielectric property;
    first and second signal internal electrodes and first and second ground internal electrodes arranged in the capacitor element body; and
    first and second signal terminal electrodes and first and second ground terminal electrodes arranged on an exterior of the capacitor element body;
    wherein the first signal internal electrode is connected to the first signal terminal electrode;
    wherein the second signal internal electrode is connected to the second signal terminal electrode;
    wherein the first ground internal electrode is connected to the first ground terminal electrode;
    wherein the second ground internal electrode is connected to the second ground terminal electrode;
    wherein the first signal internal electrode and the first ground internal electrode have respective regions opposed so as to sandwich at least a portion of the capacitor element body;
    wherein the second signal internal electrode and the second ground internal electrode have respective regions opposed so as to sandwich at least a portion of the capacitor element body;
    wherein the first signal internal electrode and the second ground internal electrode are not opposed to each other;
    wherein the second signal internal electrode and the first ground internal electrode are not opposed to each other;
    wherein the first signal internal electrode and the second signal internal electrode are connected through a signal throughhole conductor arranged in the capacitor element body; and
    wherein the first ground internal electrode and the second ground internal electrode are connected through a ground throughhole conductor arranged in the capacitor element body.

2. The feedthrough multilayer capacitor according to claim 1,
    wherein the first signal internal electrode and the second ground internal electrode are located in an identical layer, and
    wherein the second signal internal electrode and the first ground internal electrode are located in an identical layer.

3. The feedthrough multilayer capacitor according to claim 1,
    wherein the first and second signal internal electrodes and the first and second ground internal electrodes are of a meander shape.

4. The feedthrough multilayer capacitor according to claim 1,
    wherein an area of the opposed regions of the first signal internal electrode and the first ground internal electrode is different from an area of the opposed regions of the second signal internal electrode and the second ground internal electrode.

5. The feedthrough multilayer capacitor according to claim 1,
    wherein the capacitor element body has first and second principal faces of a rectangular shape facing each other, first and second end faces extending in a transverse direction of the first and second principal faces so as to connect the first and second principal faces, and first and second side faces extending in a longitudinal direction of the first and second principal faces so as to connect the first and second principal faces;
    wherein the first and second signal terminal electrodes are disposed on the first side face;
    wherein the first and second ground terminal electrodes are disposed on the second side face;
    wherein the signal throughhole conductor is located nearer the second side face; and
    wherein the ground throughhole conductor is located nearer the first side face.

6. The feedthrough multilayer capacitor according to claim 1,
wherein the first signal internal electrode has a main electrode portion including the region opposed to the first ground internal electrode, a lead portion extending from the main electrode portion and connected to the first signal terminal electrode, and a connection portion connected to the signal throughhole conductor;
wherein the second signal internal electrode has a main electrode portion including the region opposed to the second ground internal electrode, a lead portion extending from the main electrode portion and connected to the second signal terminal electrode, and a connection portion connected to the signal throughhole conductor;
wherein the first ground internal electrode has a main electrode portion including the region opposed to the first signal internal electrode, a lead portion extending from the main electrode portion and connected to the first ground terminal electrode, and a connection portion connected to the ground throughhole conductor; and
wherein the second ground internal electrode has a main electrode portion including the region opposed to the second signal internal electrode, a lead portion extending from the main electrode portion and connected to the second ground terminal electrode, and a connection portion connected to the ground throughhole conductor.

7. A feedthrough multilayer capacitor comprising:
a capacitor element body with a dielectric property;
a plurality of internal electrode groups each of which includes a signal internal electrode and a ground internal electrode aged in the capacitor element body so as to have respective regions opposed so as to sandwich at least a portion of the capacitor element body; and
first and second signal terminal electrodes and first and second ground terminal electrodes arranged on an exterior of the capacitor element body;
wherein the signal internal electrodes in the respective internal electrode groups are electrically connected to each other and at least one of electrical connections between the signal internal electrodes is made by a signal throughhole conductor arranged in the capacitor element body;
wherein the ground internal electrodes in the respective internal electrode groups are electrically connected to each other, and at least one of electrical connections between the ground internal electrodes is made by a ground throughhole conductor arranged in the capacitor element body;
wherein one signal internal electrode among the signal internal electrodes in the respective internal electrode groups is connected to the first signal terminal electrode, and one signal internal electrode other than said one signal internal electrode among the signal internal electrodes in the respective internal electrode groups is connected to the second signal terminal electrode;
wherein one ground internal electrode among the ground internal electrodes in the respective internal electrode groups is connected to the first ground terminal electrode, and any one ground internal electrode other than said one ground internal electrode among the ground internal electrodes in the respective internal electrode groups is connected to the second ground terminal electrode; and
wherein the signal internal electrode and the ground internal electrode in respective different internal electrode groups among the plurality of internal electrode groups are not opposed to each other.

8. The feedthrough multilayer capacitor according to claim 7,
wherein all the electrical connections between the signal internal electrodes are made by the signal throughhole conductor arranged in the capacitor element body; and
wherein all the electrical connections between the ground internal electrodes are made by the ground throughhole conductor arranged in the capacitor element body.

* * * * *